United States Patent [19]

Chabinsky

[11] Patent Number: 4,458,128
[45] Date of Patent: Jul. 3, 1984

[54] MICROWAVE SHEET RUBBER CURING

[75] Inventor: Irving J. Chabinsky, Acton, Mass.

[73] Assignee: Raytheon Company, Lexington, Mass.

[21] Appl. No.: 479,422

[22] Filed: Mar. 28, 1983

[51] Int. Cl.³ .................................... H05B 5/00
[52] U.S. Cl. .................. 219/10.55 R; 219/10.55 M; 219/10.55 D; 219/10.57; 219/10.61 R; 425/174; 425/174.8 R
[58] Field of Search ............... 219/10.55 R, 10.55 A, 219/10.55 M, 10.57, 10.59, 10.61 R, 10.55 D; 34/153; 425/174, 174.4, 174.8 E, 174.8 R; 156/73.1, 272.2

[56] References Cited

U.S. PATENT DOCUMENTS

| | | |
|---|---|---|
| 2,743,479 | 5/1956 | Rhee et al. ............... 425/174.8 R |
| 3,181,251 | 5/1965 | Ege et al. .................... 34/153 |
| 3,475,522 | 10/1969 | Garibian et al. ............ 425/174.8 R |
| 3,476,904 | 11/1969 | Schroeder ................. 219/10.55 A |

OTHER PUBLICATIONS

Irving J. Chabinsky, "Microwaves 'What', 'Where', 'How' Heating with Microwaves", presented at Southern Rubber Group-75th Meeting, New Orleans, Louisiana, Nov. 5-6, 1981.

*Primary Examiner*—Roy N. Envall, Jr.
*Assistant Examiner*—Marvin M. Lateef
*Attorney, Agent, or Firm*—William R. Clark; Joseph D. Pannone

[57] ABSTRACT

Apparatus and method for curing sheet rubber by radiation of microwave energy. The sheet rubber is wrapped around a metal cylinder forming a roll with a layer or liner of microwave transparent material separating the adjacent rubber layers. The ends of the roll are shielded from microwave energy by metal disks which support the cylinder. The disks sit between rollers of a roller conveyor which is activated to provide the result of rotating the roll for uniform heating in a microwave field.

15 Claims, 6 Drawing Figures

MICROWAVE SHEET RUBBER CURING

BACKGROUND OF THE INVENTION

There are many applications for calendered rubber. One example of an application is roofing material wherein the sheets are rolled out over the surface of the roof to provide waterproofing and insulation. Other illustrative applications are floor matting, conveyor belts, dye cut parts such as gaskets, and protective clothing such as aprons. The preferred thickness of the calendered rubber will generally vary according to the application; typically, the thickness will be in the range from several mils to several thousand mils. Furthermore, a particular rubber compound from the broad categories of natural and synthetic rubbers may have advantage for certain applications.

As is well known, rubber sheeting is commonly formed using a calender wherein uncured or green rubber is pressed between two rotating parallel rollers to form a sheet. The thickness of the sheet is, of course, determined by the separation of the calender rollers. The width and length are also conventionally controlled. Also, the sheet surface characteristics or pattern can be determined by the surface of the rollers.

After passing through the calender, the rubber sheets must be cured to form the requisite molecular bonds which provide the strength and elasticity of rubber. In the prior art, the curing heat has generally been provided by either steam or hot air. Illustrative examples will be described for both of these curing methods.

Super heated steam under pressure is typically applied to the rubber in an autoclave. First, the calendered material is rolled onto a steel drum with a liner separating the layers of rubber to prevent interaction and bonding between the rubber layers. Common materials used for liner separation are cotton, polyester, powder such as talc, and paper. The amount of calendered material rolled onto the drum is greatly limited by the fact that rubber is a very good thermal insulator, and, as such, a large cross-section of material wrapped on the drum would lead to excessive cure time as well as the possibility of scorch or over cure. Generally, the cross-section of material placed on the drum is two inches, limiting the heat transfer requirements to one inch from the drum wall and outside surface.

Drum sizes are usually in the 18 to 24-inch range and are mainly constrained by the autoclave and/or hot air physical size for effective energy operation and capital cost. Generally, the larger the diameter of the drum the greater the amount of rubber that can be effectively cured. In one example, a 22 mil NR-white rubber calendered sheet is rolled on a 24-inch diamter drum to a roll thickness of 2 inches which is approximately equal to 200 pounds of rubber. The drum is then lowered into a pit autoclave and, after the lid is locked, the curing time is 186 minutes. Accordingly, this curing method is time consuming. Even when the throughput is increased by using an autoclave large enough so that six of the above-described roll drums can be processed simultaneously, the throughput is still only about 3100 pounds of rubber per 8-hour shift. Furthermore, energy cost for the steam autoclave has been calculated to be approximately $0.00112 per pound of rubber even when six rolls are processed simultaneously. This calculation is based on an energy cost of $0.05 per kilowatt hour.

The hot air curing method is typically performed in an industrial hot air oven. As with steam curing, the calendered rubber is rolled onto steel drums with liner material separating the rubber layers. In one example, a 57 mil EPDM rubber compound roofing sheet having a width of 54 inches is calendered to a cross-section of 2 inches on a 22-inch diameter steel drum using a 20 mil liner. During curing, the rubber expands so that the cured sheet will have a thickness of approximately 60 mils after processing. For this example, the rubber is cured in stages within a hot air oven. First, it is heated in the hot air oven for three hours at 250° F. Then, the temperature is raised to 290° F. for five hours. Finally, the temperature is lowered to 250° F. for three more hours and, after a total of eleven hours in the oven, the rolls are removed from the oven and cooled for eight hours before being stripped. Even though a plurality of rolls can be cured simultaneously in the same oven if it is large enough, it is still desirable to have substantially higher throughput than is possible with this hot air method. Increasing the driving force by raising the temperature is not a feasible approach to increasing throughput because of the surface temperature sensitivity of rubber compounds. When one or more rolls are cured in the oven or autoclave, they are generally mounted on a fixture or truck. Accordingly, not only do the metal drum and the oven walls act as heat sinks and have to be brought up to temperature, but also, all transport fixtures have to be heated as well. Additionally, the liner material utilized in separating the rubber plies usually has as poor heat transfer characteristics as the rubber thus increasing the time and energy required to reach cure temperature.

In summary, curing of rubber rolled sheets by inward conduction of heat from steam or hot air is very inefficient in terms of time and energy.

SUMMARY OF THE INVENTION

The invention discloses an apparatus for curing calendered rubber with microwave energy, comprising a microwave oven, a pair of apertured conductive disks parallelly spaced in the microwave oven, a conductive cylinder inserted through the apertures of the disks, a roll of the calendered rubber wrapped around the conductive cylinder between the disks, the roll having a microwave transparent liner separating adjacent layers of the calendered rubber, the ends of the roll abutting against corresponding surfaces of the disks and means for rotating the disks, cylinder, and roll about a mutual axis while irradiating with microwave energy to provide uniform heating of the calendered rubber. Calendered rubber may include a single sheet of rubber or a plurality of sheets to be bonded together during curing. The layers may also include a layer of a different material to be bonded with rubber sheets in the curing process. It may be preferable that the rotating means comprise parallel metal rollers of a roller conveyor supporting the disks in the microwave oven. Also, it may be preferable that the disks have a larger circumference than the roll so that the roll is elevated from the roller conveyor and the rotation is imparted to the roll through the disks and cylinder. It may also be preferable that the roll comprise a plurality of surface layers of microwave transparent liner secured by straps. The microwave energy may preferably be at a frequency of 2450 megahertz or 915 megahertz. In essence, the cylinder may function as a axle between the disks which function as wheels to drive the cylinder. The roll of rubber is accordingly rotated also and its ends are shielded by the disks or wheels which are pressed up against the ends of the roll.

The invention may be practiced by an apparatus for curing calendered rubber with microwave energy, comprising a microwave oven having an access opening and a door, a roller conveyor positioned in the cavity of the oven, the conveyor comprising a plurality of parallelly spaced conductive rollers aligned in a horizontal plane, a pair of spaced conductive disks parallelly supported between two adjacent conductive rollers of the roller conveyor wherein rotation of the rollers imparts rotation to the disks, each of the disks having an aperture, a conductive cylinder inserted through the apertures of the disks and supported thereby, a roll of sheet rubber wrapped around the conductive cylinder between the disks wherein adjacent layers of the sheet rubber are separated by a microwave transparent liner, the disks having a larger circumference than the roll, the ends of the roll being respectively abutted against the disks to prevent microwave energy from entering the roll through its ends, and means for rotating the rollers for rotating the disks, cylinder, and roll to provide uniform heating of the calendered rubber by irradiation of microwave energy. The roll may preferably have a plurality of layers of the microwave transparent material surrounding the outer surface so as to increase the internal pressure in the roll during heating. The roll may be secured by straps or bands of microwave transparent material. The microwave energy may be provided by a plurality of directive radiators positioned in the top of the cavity of the microwave oven.

The invention also defines the method of curing calendered rubber with microwave energy, comprising the steps of wrapping a roll comprising alternating layers of elongated calendered rubber and a microwave transparent liner on a conductive cylinder, shielding the ends of the roll to prevent microwave energy from entering the roll therethrough, and rotating the roll and cylinder while radiating microwave energy to provide uniform heating within the roll to cure the calendered rubber. Preferably, the shielding of the ends of the roll may be provided by conductive metal disks which are perpendicular to the cylinder and abut the ends of the roll. It is desirable that the disks be larger than the roll so that they can function as wheels and be driven to impart rotation to the roll. The driving force for the disks may be two rollers of a roller conveyor.

The invention may also be practiced by the method of curing rubber sheet with microwave energy, comprising the steps of wrapping a roll comprising alternating layers of an elongated rubber sheet and a microwave transparent liner on a conductive cylinder, sliding apertured metal disks over the respective ends of the cylinder and positioning the disks against the respective ends of the roll, the disks having a larger circumference than the roll, supporting the disks between two parallel rollers of a roller conveyor in a microwave oven cavity, activating the rollers to rotate the disks, cylinder, and roll, and energizing the cavity with microwave energy to cure the rubber while continuing to rotate the rollers.

BRIEF DESCRIPTION OF THE DRAWINGS

The objects and advantages of the invention will be more fully understood by reading the Description of the Preferred Embodiment with reference to the drawings wherein.

DESCRIPTION OF THE PREFERRED EMBODIMENT

Figure 1:
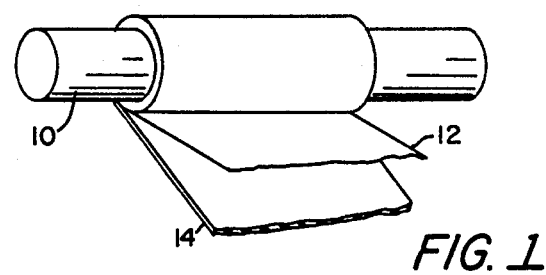
FIG. 1 is the first step of the inventive process where sheet rubber and a liner are being rolled around a metal cylinder.
Figure 2:
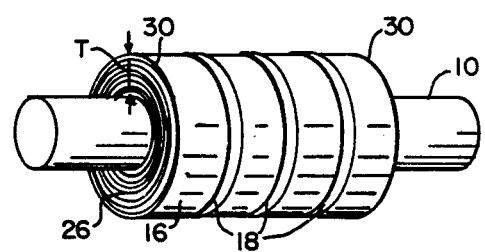
FIG. 2 is the second step when the roll is completed and bound.
Figure 3:
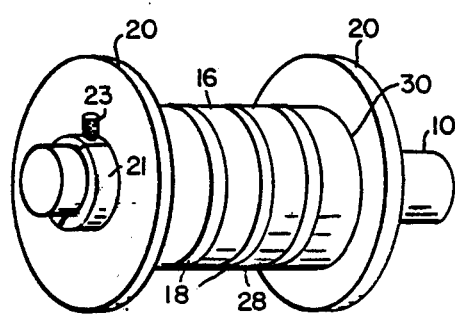
FIG. 3 is the third step where metal disks are inserted over the ends of the cylinder and pressed up against the ends of the roll.

Referring to FIGS. 1, 2, and 3, there are shown sequential stages of the method for preparing rubber sheet 14 for curing in a microwave oven. Although specific examples will be described later herein, one of skill in the art will realize that most rubber compounds (natural and synthetic) could be processed using microwave energy in accordance with the invention. The width of sheet 14 will generally be a function of the anticipated application and calender capability; widths in the range from 12 inches to 54 inches may presently be considered to be very common but widths to 54 feet are anticipated for the future. Also, the thickness of sheet 14 will generally be a function of the application. For example, roof sheeting may have a thickness of 60 mils.

As shown in FIG. 1, rubber sheet 14 is rolled onto an aluminum cylinder 10 with microwave transparent liner 12 or layer separating the layers of rubber to prevent interaction therebetween during curing. The diameter of the drum will be the largest possible, consistent with the size of the microwave oven and effectiveness for handling, to maximize the amount of rubber processed in any specific period of time. Liner 12 may conventionally be made from a variety of materials such as, for example, paper, polyester, cottons, or even talc and may have different patterns to provide inprints in the surface of the rubber sheet 14.

The upper limit on the length of rubber sheet 14 in accordance with the invention may approximately be determined by the dielectric properties of the rubber compound and the thickness of the rubber sheet. More specifically, as a general rule, it may be preferable that the microwave power density at the inner rubber layer of roll 16 be more than half the power density at the surface of the roll. Stated in different terms, if the roll were so thick that very little microwave energy could penetrate to the depth of the inner layers, those inner layers would not be adequately cured unless considerable heat conduction time were permitted. The half power depth into the dielectric may be approximated by the equation:

$$D = \frac{3\lambda_o}{8.686 \, \pi \, \tan \delta \, \sqrt{\epsilon'/\epsilon_o}}$$

where
 D = the depth of penetration in centimeters,
 $\lambda_0$ = wavelength in free space in centimeters, tan $\delta$ = dielectric loss tangent, and
 $\epsilon^1/\epsilon_0$ = dielectric constant.

As an example, if the dielectric properties of a particular rubber compound were such that the half power depth of penetration were 10 centimeters, that would mean that it might be preferable that the thickness T of roll 16 from aluminum cylinder 10 to the outer surface be approximately 10 centimeters or less. It follows that if each layer of rubber sheet 14 were 0.5 centimeters thick, it would be preferable to have 20 or fewer layers of the rubber sheet in the roll. Accordingly, with knowledge of the diameter of the aluminum cylinder 10, the approximate upper limit on the length of rubber sheet 14 can readily be calculated. For purposes of this illustrative example, it is assumed that the separating liner 12 is transparent to microwave energy. It is also noted that cylinder 10 is a metal such as aluminum or stainless steel so that microwave energy which would otherwise propagate further into the medium is reflected back into the rubber layers where it can be additive with incoming energy. Further, it is desirable to space the inner rubber layer from the metal cylinder 10 to insulate the rubber from the cylinder to reduce cylinder heat sinking; this can be done by first wrapping the metal cylinder with a microwave transparent material such as liner 12.

Referring to FIG. 2, roll 16 is shown on metal cylinder 10. After rolling the rubber sheet and microwave transparent separating liner 12 onto metal cylinder 10 to a thickness in accordance with the above description, additional layers of just the liner 12 are preferably wrapped tightly around the roll. Accordingly, the roll will consist of alternating layers of rubber sheet 14 and liner 12 out to a particular roll depth and then there will be several layers of just the liner. The roll 16 is then bound by suitable means such as microwave transparent masking tape straps 18. In addition to reducing radiation heat loss from the roll, the purpose of the additional layers of liner 12 on the outside is to restrain the expansion of the rubber during curing thereby causing an increase in internal pressure which assists the curing process and helps maintain thermal cross-section stability. If the roll were to be cured by steam or hot air rather than by microwave energy, the additional surface layers of liner 12 would inhibit the inward conduction of heat.

Referring to FIG. 3, the completion of the next step in the process of preparing rubber sheet 14 for microwave curing is shown. More specifically, conductive end disks 20 having apertures conforming to the size of metal cylinder 10 are slid onto the ends of the metal cylinder and are pressed up against the ends of roll 16 as shown. Disks 20 are secured in position by suitable means such as clamps 21 with tightening bolts 23. Disks 20 perform two important functions. First, they act as wheels providing circumferential surfaces 22 upon which rubber curing assembly 24 is supported and rotated as will be described in more detail later herein. Second, disks 20 prevent microwave energy from entering into roll 16 from its ends 26. This is important because if energy were permitted to enter roll 16 from its ends 26 and its outer cylindrical surface 28, there would be regions near the edges 30 where intense fields and resulting hot spots would be created by the summation of energy coming from different directions. Hot spots could cause scorching or premature curing of the rubber in these regions.

Figure 4:
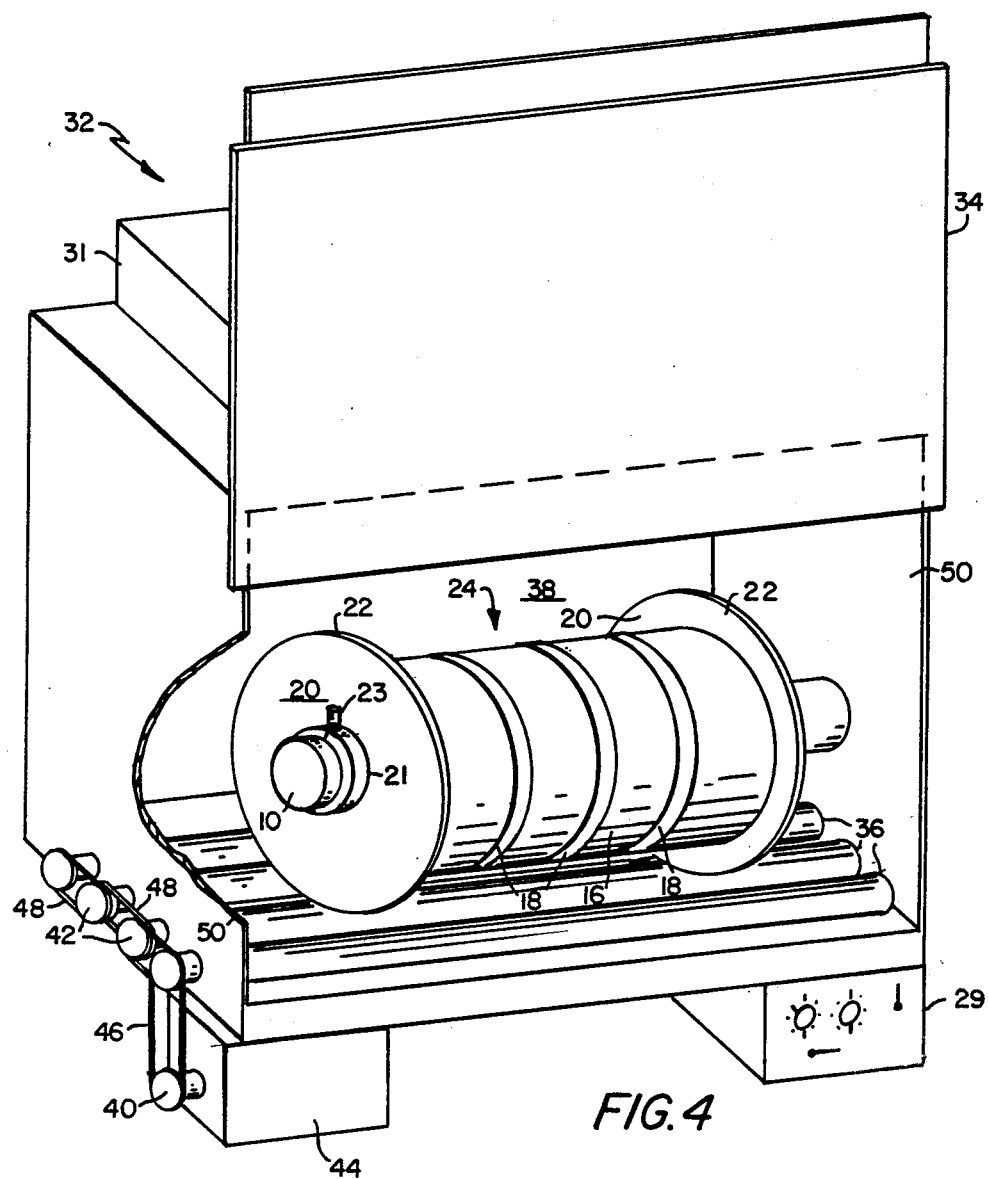
FIG. 4 shows the embodiment of FIG. 3 supported between parallel rollers of a roller conveyor in a microwave oven.
Figure 5:
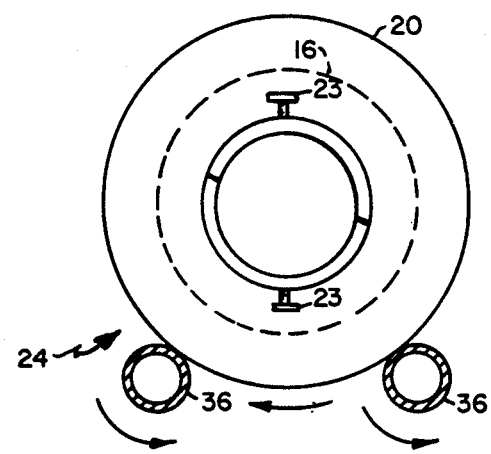
FIG. 5 is an end view of the assembly of FIG. 3 as supported by rollers of the conveyor of FIG. 4.

Referring to FIG. 4, assembly 24 of FIG. 3 in accordance with the invention is shown positioned in a suitable industrial microwave oven 32 such as, for example, a Model QMP1785A-I as is commercially available from Raytheon Company of Lexington, Mass. Oven 32 may be provided with a vertically sliding door 34 including conventional apparatus for providing a microwave seal in the gap around the door. Parallel rollers 36 are positioned in a horizontal plane near the floor of cavity 38 to provide a roller conveyor for moving product into and out of the batch type cavity. In accordance with the invention, circumferential surfaces 22 of disks 20 contact two adjacent rollers 36 as shown, thereby supporting assembly 24. As shown best in FIG. 5, the rotation of rollers 36 cause in place rotation of disks 20 and the entire assembly 24 as shown in FIG. 3. As an example, the above-identified Model QMP1785A-I provides 16 kilowatts of microwave energy at a frequency of 2450 megahertz. The microwave energy is delivered by a plurality of directive microwave radiators (not shown) positioned in a horizontal plane near the ceiling of cavity 38 and feed from top mounted housing 31. A control panel 29 is used to control the operation of door 34, the microwave energy, and rollers 36.

Figure 6:
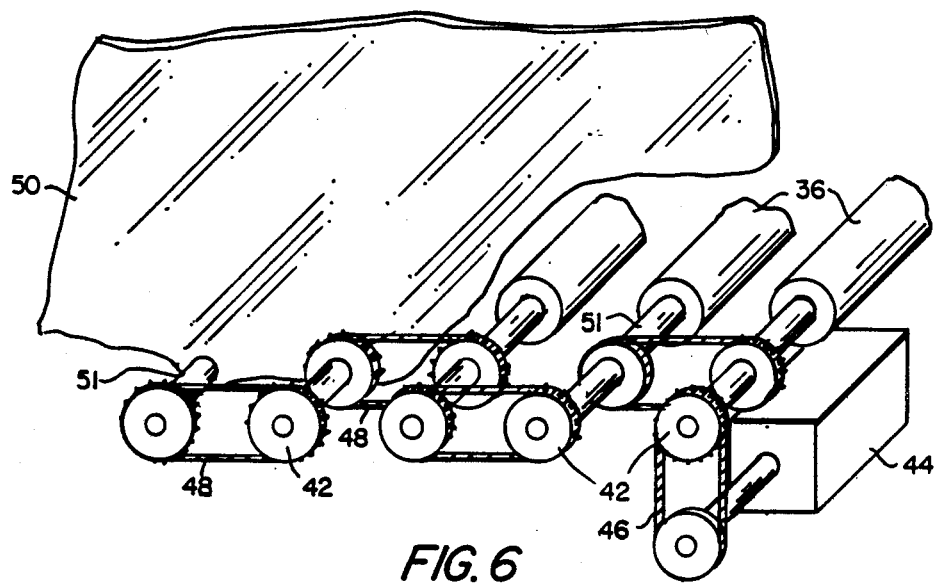
FIG. 6 is an expanded view of the drive mechanism for the roller conveyor of FIG. 4.

Referring to FIG. 6, an expanded view of gears 40 and 42 of FIG. 4 is shown. More specifically, motor 44 may be coupled through a gear reduction box (not shown) to gear 40 which drives a chain 46 coupled to one of gears 42. Adjacent gears 42 are coupled by alternating drive chains 48 as shown. Accordingly, each gear 42 is driven in the same rotational direction at the same speed. Gears 42 are connected to shafts 51 which extend through cavity side walls 50 and connect to respective rollers 36. Accordingly, assembly 24 as shown in FIG. 3 can be supported by any two adjacent rollers 36 and rotation activated by control panel 29.

In operation, assembly 24 is positioned in cavity 38 and control panel 29 is used to lower door 34 which seals the access opening thereby preventing leakage of microwave energy. Next, motor 44 is activated to drive rollers 36 which causes in place rotation of assembly 24. Control panel 29 is then used to energize cavity 38 with microwave energy which is directed downwards onto roll 16. Because disks 20 shield roll 16 from microwave energy on the ends, microwave energy only enters roll through its outer cylindrical surface 28. Accordingly, hot spots are not concentrated near edges 30. Although the rotation rate of the assembly may not be critical, an operative example defines rollers 36 having diameters of 6 inches and providing a roll rate of 6 feet per minute. With disks 20 having diameters of slightly less than 3 feet, that corresponds to assembly 24 having an angular rotation of approximately ⅔ revolution per minute.

Although one of ordinary skill in the art will recognize that many of the parameters described herein could be modified without departing from the spirit and scope of the invention, the two specific examples described in the Background herein will be described as examples 1 and 2 below.

EXAMPLE 1

For a comparison with the illustrative example of steam curing described in the Background herein, 1500 pounds of NR-white 22 mil calendered rubber rolled on two 27-inch diameter aluminum cylinders or drums resulted in a roll thickness of approximately 4.25 inches. The aluminum cylinders represented about 18 percent of the total mass. The assemblies 24 including disks 20 as shown in FIG. 3 were seated on rollers 36 in the cavity 38 of a Model QMP1785AI-2 industrial microwave oven which is similar to the Model QMP1785A-1 described above but has two sections and a power output of 32 kilowatts. After 30 minutes of microwave exposure, the rubber was at the curing temperature of approximately 320° F. Once at the curing temperature, the rubber had to be maintained for a dwell time such as, for example, 30 minutes to effect the requisite molecular curing bonds. The curing temperature may be maintained by reducing the output power of the microwave oven so that the heat generated within the rubber is approximately equal to the radiation losses thereby holding a constant temperature. The curing temperature may also be maintained by an alternate process wherein the roll is removed from the microwave oven and positioned in a hot air oven. In either case, the total curing time is substantially less than the curing time in a steam autoclave. Also, the energy required for microwave processing has been calculated to be $0.00035 per pound.

EXAMPLE 2

For a comparison with the illustrative example of hot air curing described in the Background herein, a 400-foot length of 54-inch wide 60 mil EPDM rubber roofing was rolled with a separating liner onto a 22-inch diameter aluminum cylinder or drum. The thickness T of roll 16 was approximately 4.5 inches. This was a similar embodiment to that described in the Background herein except that the length of the sheet was approximately twice as long. In other words, the microwave roll had about twice as much rubber compound. In contrast to the approximately 19 hours (11 hours of heating plus 8 hours of cooling) of processing with hot air, the rotating roll was exposed to 16 kilowatts of microwave energy for approximately 1 hour and then processed in a hot air postcure at 290° F. for 1 hour. The roll was immediately stripped or unrolled and the entire length was completely cured. The microwave energy had raised the temperature of the rubber to approximately 320° F.

Examples 1 and 2 illustrate that, compared to curing with steam or hot air, curing with microwave energy in accordance with the invention provides increased throughput and decreased energy costs. The higher throughput may even be attained when comparing a single roll in microwave energy to the simultaneous processing of several rolls in conventional heat. Accordingly, another advantage is that an assembly 24 can be taken directly from the calender and positioned in the microwave oven without permitting significant cooling. This saves energy over the conventional curing method where considerable time elapses before a fixture is filled with rolls. During this time, the uncured rubber which may typically come out of the calender at 130° F. cools down this wasting heat.

The invention has been described with reference to specific embodiments and methods. Those of ordinary skill in the art, however, will realize that there are many modifications that do not depart from the spirit and scope of the invention. One important feature of the invention is the use of disks 20 to shield the ends of the roll and thereby prevent scorching or premature curing of the edges of the rubber roll. It is also important that the roll rotate so as to provide more uniform heating of the roll. It is also preferable that the microwave energy be somewhat directive. Also, it is preferable that the cylinder be conductive. Because there are many possible modifications, it is intended that the scope of the invention be limited only by the appended claims.

What is claimed is:

1. Apparatus for curing calendered rubber with microwave energy, comprising:
   a microwave oven;
   a pair of apertured conductive disks parallelly spaced in said microwave oven;
   a conductive cylinder inserted through said apertures of said disks;
   a roll of said sheet rubber wrapped around said conductive cylinder between said disks, said roll having a microwave transparent liner separating adjacent layers of said sheet rubber, the ends of said roll abutting against the adjacent faces of said disks; and
   means for rotating said disks, cylinder, and roll about a mutual axis while irradiating with microwave energy to provide uniform heating of said sheet rubber.

2. The apparatus recited in claim 1 wherein said rotating means comprises parallel metal rollers of a roller conveyor supporting said disks in said microwave oven.

3. The apparatus recited in claim 1 wherein said disks have larger circumferences than said roll.

4. The apparatus recited in claim 1 wherein said roll comprises a plurality of layers of said microwave transparent liner near the surface, said roll being bound to prevent unrolling.

5. Apparatus for curing calendered rubber with microwave energy, comprising:
   a microwave oven having an access opening and a door;
   a roller conveyor positioned in the cavity of said oven, said conveyor comprising a plurality of parallelly spaced metal rollers aligned in a horizontal plane;
   a pair of spaced metal disks parallelly supported between two adjacent metal rollers of said roller conveyor, each of said disks having an aperture;
   a metal cylinder inserted through said apertures of said disks and supported thereby;
   a roll of calendered rubber wrapped around said metal cylinder between said disks wherein adjacent layers of said calendered rubber are separated by a microwave transparent liner, said disks having a larger circumference than said roll;
   the ends of said roll being respectively abutted against said disks to prevent microwave energy from entering said roll through said ends; and
   means for rotating said rollers to impart rotation to said disks, cylinder, and roll thereby providing uniform heating of said calendered rubber during irradiation by microwave energy.

6. The apparatus recited in claim 5 wherein said roll comprises a plurality of layers of said microwave transparent liner near the surface, said roll being bound to prevent unrolling.

7. The apparatus recited in claim 5 wherein said irradiation of microwave energy is provided by a plurality of directive radiating elements positioned in the top of the cavity of said oven.

8. The apparatus recited in claim 5 wherein said door opens vertically.

9. The method of curing calendered rubber with microwave energy, comprising the steps of:
   wrapping a roll comprising alternating layers of an elongated calendered rubber and a microwave transparent liner on a conductive cylinder;
   shielding the ends of said roll to prevent microwave energy from entering said roll therethrough; and rotating said roll and cylinder while radiating microwave energy to provide uniform heating within said roll to cure said calendered rubber.

10. The method recited in claim 9 wherein said ends are shielded by metal disks perpendicular to the axis of said cylinder and abutting the ends of said roll.

11. The method recited in claim 10 wherein said rotating is provided by rotating said disks which are seated between two rollers of a roller conveyor.

12. The method of curing calendered rubber with microwave energy, comprising the steps of:
    wrapping elongated uncured calendered rubber around a metal cylinder to form a roll wherein the adjacent layers of said calendered rubber are separated by a microwave transparent liner;
    shielding the ends of said roll with conductive disks; and
    rotating said cylinder, roll, and disks about a mutual axis while radiating microwave energy to cure said rubber sheet.

13. The method recited in claim 12 wherein said metal cylinder is supported by said disks which are seated between parallel rollers of a roller conveyor of a microwave oven.

14. The method recited in claim 12 wherein said disks have central apertures through which said metal cylinder inserts.

15. The method of curing calendered rubber with microwave energy, comprising the steps of:
    wrapping a roll comprising alternating layers of elongated calendered rubber and a microwave transparent liner on a conductive cylinder;
    sliding apertured metal disks over the respective ends of said cylinder and positioning said disks against the respective ends of said roll, said disks having a larger circumference than said roll;
    supporting said disks between two parallel rollers of a roller conveyor in a microwave oven cavity;
    activating said rollers to rotate said disks, cylinder, and roll; and
    energizing said cavity with microwave energy to cure said rubber while continuing to rotate said rollers.

* * * * *